Jan. 12, 1960     R. F. IAGER ET AL     2,920,609
FORCED FLOW PRESSURE FIRED VAPOR GENERATOR AND SUPERHEATER
Filed April 20, 1953     11 Sheets-Sheet 1

INVENTORS
JOHANNES H. AMMON
ERNEST C. HUGE
ROLAND T. BRYAN
RAYMOND F. IAGER
BY
ATTORNEY

FIG. 4

INVENTORS
JOHANNES H. AMMON
ERNEST C. HUGE
ROLAND T. BRYAN
RAYMOND F. IAGER
BY
ATTORNEY

FIG. 5

INVENTORS
JOHANNES H. AMMON
ERNEST C. HUGE
ROLAND T. BRYAN
RAYMOND F. IAGER

ATTORNEY

Jan. 12, 1960  R. F. IAGER ET AL  2,920,609
FORCED FLOW PRESSURE FIRED VAPOR GENERATOR AND SUPERHEATER
Filed April 20, 1953  11 Sheets-Sheet 11

INVENTORS
JOHANNES H. AMMON
ERNEST C. HUGE
BY ROLAND T. BRYAN
RAYMOND F. IAGER
ATTORNEY

2,920,609

FORCED FLOW PRESSURE FIRED VAPOR GENERATOR AND SUPERHEATER

Raymond F. Iager, Alliance, and Ernest C. Huge and Johannes H. Ammon, Akron, Ohio, and Roland T. Bryan, Falls Church, Va., assignors to The Babcock & Wilcox Company, New York, N.Y., a corporation of New Jersey Application April 20, 1953, Serial No. 349,674

12 Claims. (Cl. 122—240)

This invention relates to a gas heated vapor generating and superheating unit including vapor generating and superheating tubes subject to the heat of pressurized combustion gases. The unit is particularly adapted for generating power for the propulsion of a submarine during its surfaced operation and during its submerged opertion. When surfaced, or at snorkle, the furnaces of the unit burn diesel oil with pressurized air, and when the submarine is submerged the furnaces burn diesel oil oxidized by oxygen under furnace gas pressures in excess of 500 p.s.i.a. and with the flames diluted by recirculated flue gases. This pressure firing provides for the discharge of the flue gases overboard even when the submarine is submerged at maximum depth.

The pertinent unit has forced circulation with the vaporizable fluid and the generating vapor forced under high pressure through a plurality of tube circuits portions of which form wall tube combustors or combustion chambers with succeeding portions of the tube circuits forming a bank of tubes of a convection heated vapor generating section.

For effective temperature control the unit involves a superheated combustor or combustion chamber, and an independently fired saturated combustor, the combustion chamber of the latter having vaporizable fluid flows through aligned tubes defining the boundaries of the combustion chamber.

In a preferred embodiment, the gases from the separately fired superheater combustor, after passing over a convection superheater, join the gases leaving the saturated combustor and proceed with them over the convection section of the liquid vaporizer tube circuits.

The pertinent unit, because of the high pressures of the combustion elements, has its component parts operably disposed within pressure vessels adapted to withstand the high fluid pressures involved. One of these pressure vessels houses the combustors for the vapor generating section and the superheating section. Another of the pressure vessels houses a vapor and liquid separator for separating the generated vapor from the vapor and liquid mixtures passing from the vapor generating combustor. A third pressure vessel involves a gas heated economizer having tubular liquid heating elements therein exposed externally to the heat of the gaseous combustion elements proceeding from the gas outlet of the pressure vessel housing the vapor generating and vapor superheating combustors.

The saturated vapor generating surface of the unit is arranged in thirty-two parallel tubular circuits forming a completely liquid cooled enclosure for the combustion chambers and having their latter parts forming cross-flow convection sections in which the major portion of the heat energy is absorbed. The vapor superheating component of the unit involves forty-two parallel tubular circuits disposed predominantly in cross-flow arrangement with respect to the heating gases.

The vapor generating circuit tubes of the unit are constructed and disposed so as to have substantially the same heat absorption, the same changes of specific volume of the fluid heated therein, and substantially the same pressure drops during operation.

As an illustration of the conditions under which the pertinent unit operates, in burning oil with oxygen as the combustion supporting gas, combustor gas temperatures of the order of 3400 F. to 3700 F. are reached in the vapor generating section. The gaseous combustion elements effecting the heating of the superheater circuits enter the superheater at temperatures of the range of 2400 to 2700 F., and the vapor pressures from the outlet of the superheater is of the order of 825 p.s.i.a.

The pertinent unit is characterized by a disposition of the tubular heating circuits within an inner casing which involves a metallic framework with interposed metallic plates, and encloses the vapor generating and vapor superheating circuits in a single gas tight unit. This unit is disposable within the pertinent pressure vessel with an annular space between the unit and the pressure vessel. This annular space is pressurized, i.e. preferably at a pressure higher than the combustion chamber gas present so that any leakage is inward rather than outward, thus avoiding a hot blast impact on the outer shell.

The operation of the pertinent unit is characterized by a higher percentage of non-luminous radiation to the tube circuits because the flue gases are composed largely of water vapor and $CO_2$, both of which have radiant emissive bands of importance. The radiation from these gases is increased by the higher pressures of the combustion gas mixtures involved in the operation of the pertinent unit.

The pertinent vapor generating and superheating unit is characterized by the use of the burner of the saturated combustor for temperature control.

A preferred embodiment of the invention is specifically set forth in the subjoined claims, but for a better understanding of the invention, its operative characteristics and advantages, recourse should be had to the following description which refers in detail to the accompanying drawings:

Figure 6:
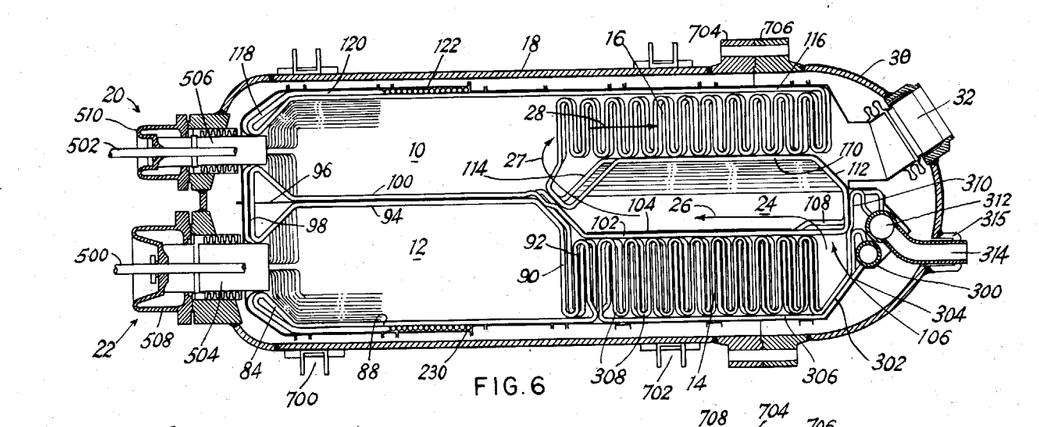
Fig. 6 is a plan section of the primary pressure vessel with its contained inner casing containing the saturated vapor generating system with its combustor and the superheated vapor system with its independently fired combustor. This view also shows the gas pass through which the high pressure combustion gases from the superheater combustor pass to the saturated combustor's gas outlet.

The vapor generating elements and the vapor superheating elements of the illustrative unit form the pressure fired combustors or combustion chambers 10 and 12, the convection superheating section 14 and the convection vapor generating section 16, arranged within the primary pressure vessel 18, as indicated in Fig. 6, and other figures of the drawings. These combustion chambers are separately and independently fired by the burners 20 and 22, the gaseous products of combustion from the superheat combustor 12 passing over the elements of the convection superheating surface 14 and then passing through the gas pass 24 and joining the gaseous combustion products from the saturated combustor chamber 10 in passing over the saturated convection section 16, as indicated by the gas flow arrows 26–28. The exhaust gases pass through the removable dome or head 30 of the primary pressure vessel 18 through the gas outlet 32 and then through the gas exhaust conduit 34 (Fig. 4) to the gas inlet end of the economizer 36. After passing over the convection elements of the economizer, indicated at 38 and 40 in Fig. 4 the gases pass from the economizer 36 through the outlet 42 to an expander which may be a turbine.

Figure 4:
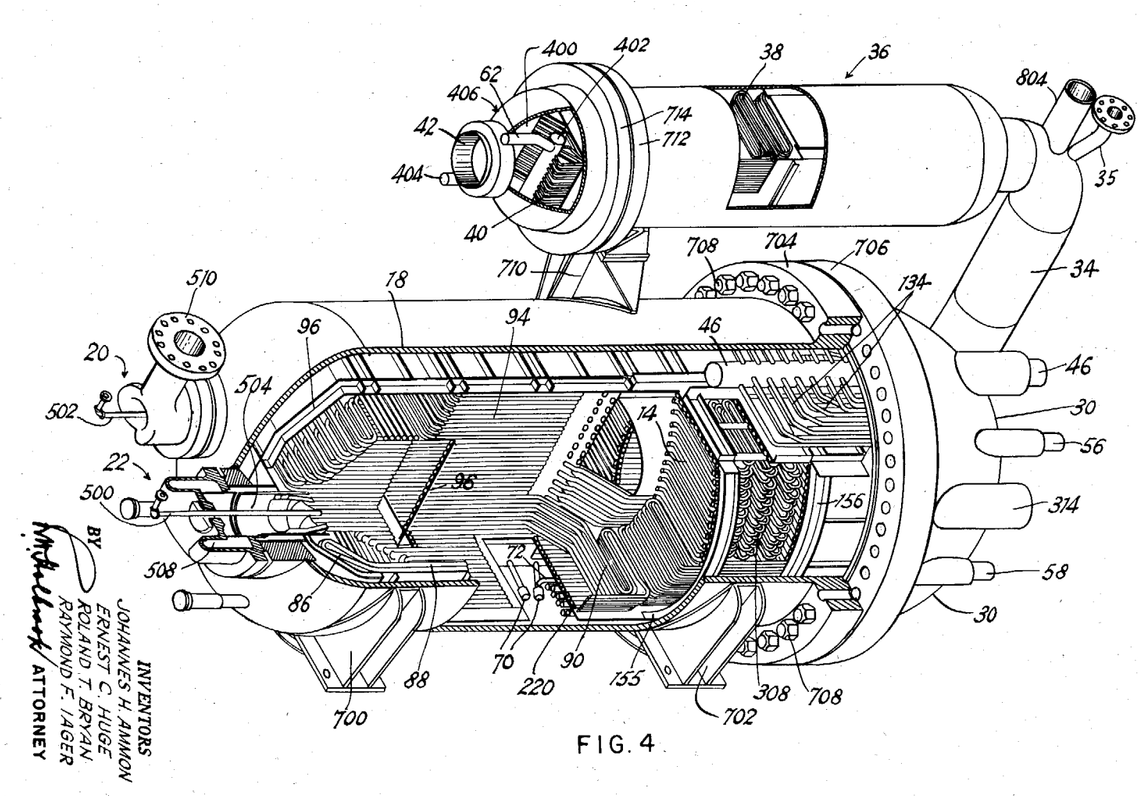
Fig. 4 is a cutaway isometric view showing the arrangement of the forced circulation vapor generating tubes and the arrangement of some of the superheater tube circuits in the primary pressure vessel containing the vapor generating combustor and the superheat combustor. This view also shows the economizer pressure vessel with portions of its wall broken away to indicate the arrangement of the economizer tube circuits.
Figure 5:
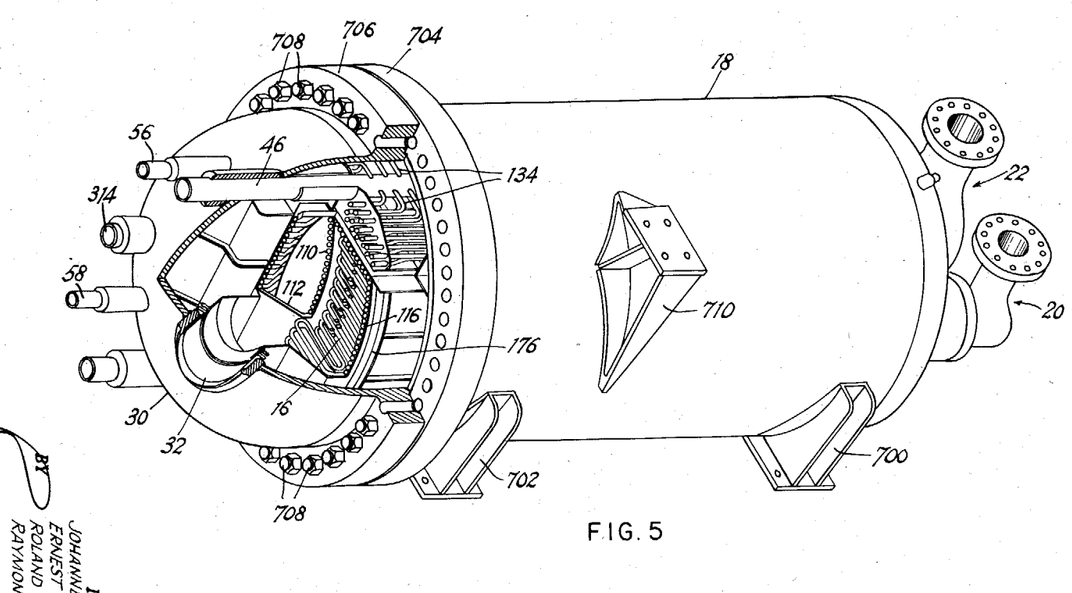
Fig. 5 is a cutaway isometric view showing the arrangement of vapor generating elements at the cutaway gas outlet end of the primary pressure vessel, and also showing the superheater inlet and outlet connections.

The conduit is shown as having a nozzle 35 for a gas safety valve to protect the combustion chamber against excessively high gas pressures.

Figures 1, 19:
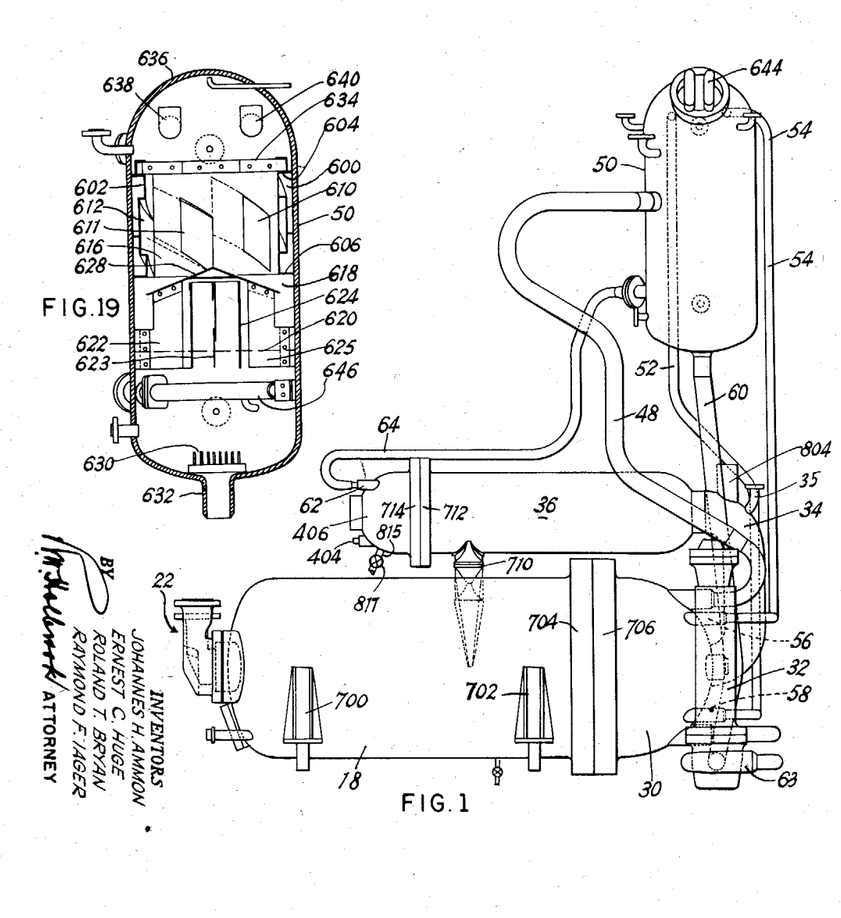
Fig. 1 is a side elevation of the illustrative vapor generating and superheating unit, showing the separate pressure vessels containing, respectively, the vapor generating and superheating combustors, the economizer, and the vapor and liquid separator.
Fig. 19 is a vertical section through the vapor and liquid separator.
Figure 2:
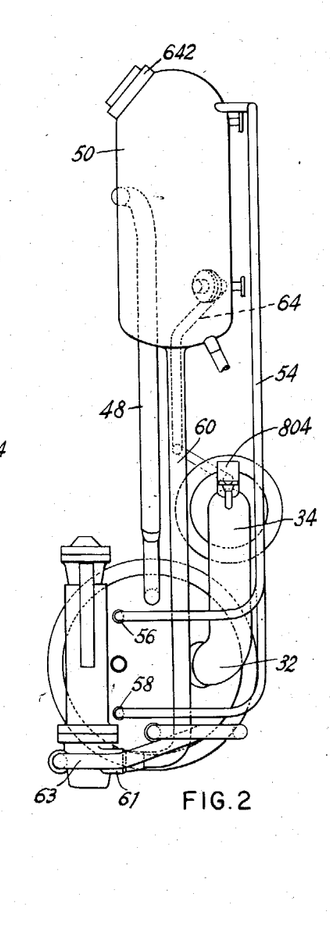
Fig. 2 is an end elevation of the illustrative unit, showing the arrangement of conduits connecting the pertinent pressure vessels.

The illustrative unit is a forced circulation unit with the vapor generating surfaces formed by separate circuit tubes which constitute independent fluid flow paths leading from the liquid or water inlet header 44 (Fig. 7) through the tubular sections forming the walls of the combustors 10 and 12 and the convection vapor generating section 16 to the liquid and vapor outlet header 46. The liquid and vapor mixtures pass from this header through the saturated flow conduit 48 to the vapor and liquid separator 50 which includes the secondary pressure vessel in which the vapor is centrifugally separated from the liquid. The separated vapor passes through saturated steam conduits 52 and 54 to the superheater inlets 56, 58. The separated liquid passes from the bottom of the separator 50 through the conduit 60 to a pump 63 having an outlet leading to the liquid inlet header 44, the separated liquid having been united with feed liquid in the lower part of the vapor and liquid separator 50. The feed liquid passes from the economizer liquid outlet 62 through the conduit 64 to the separator 50 as indicated in Fig. 1. The feed liquid entry at a low position in the separator helps cool the downcomer, thus minimizing the required head on the circulating pump 63.

Figure 10:
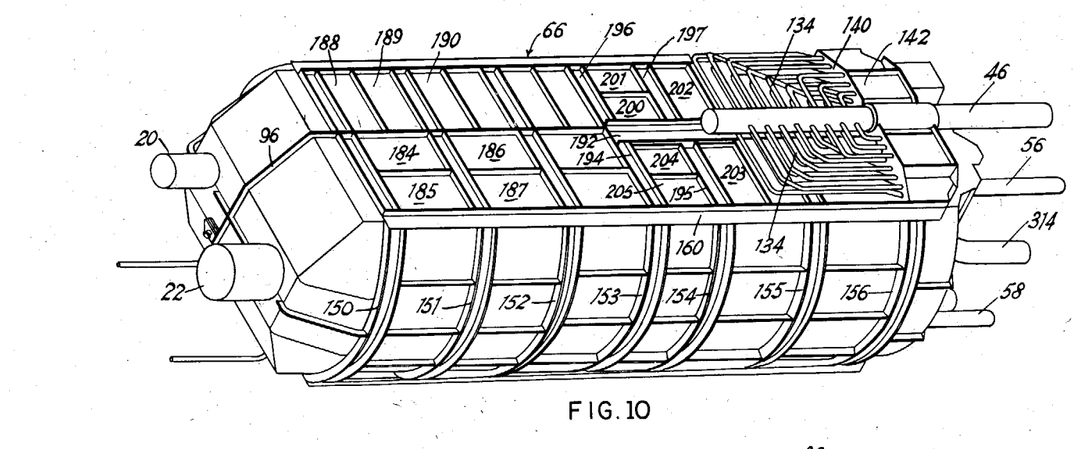
Fig. 10 is an isomeric view showing the completed inner casing unit ready to be placed in the pressure shell of the primary pressure vessel.

The tubular elements of the vapor generator and the superheater are housed within an inner casing indicated generally at 66. This casing with the tubular elements assembled therewith is indicated in Fig. 10 as a completed assembly ready to be placed within the primary pressure vessel 18. The annular space between the pressure vessel and the inner casing assembly is normally under a gas pressure higher than the combustion chamber pressure by an amount substantially corresponding to the pressure drop of the burner (i.e. 22, Fig. 7) by reason of the 823 (Fig. 7) connection between the burner air (or oxygen) supply line 800 and the annular space about the inner casing assembly. In the event of a gas leak in the inner casing, that leak is indicated by the reading of the flow indicator 821 (Fig. 7) in communication with line 823.

Figure 8:
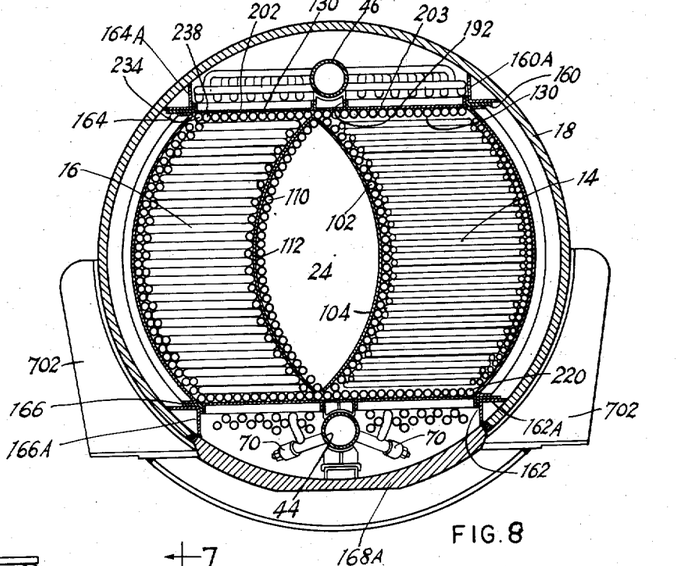
Fig. 8 is a transverse vertical section through the primary pressure vessel on the line 8—8 of Fig. 7, particularly showing the arrangement therein of the inner casing, the saturated inlet and outlet headers, the resistors, the gas pass and its wall tubes and the circuit tubes in the convection parts of the superheater and the vapor generating section.
Figure 9:
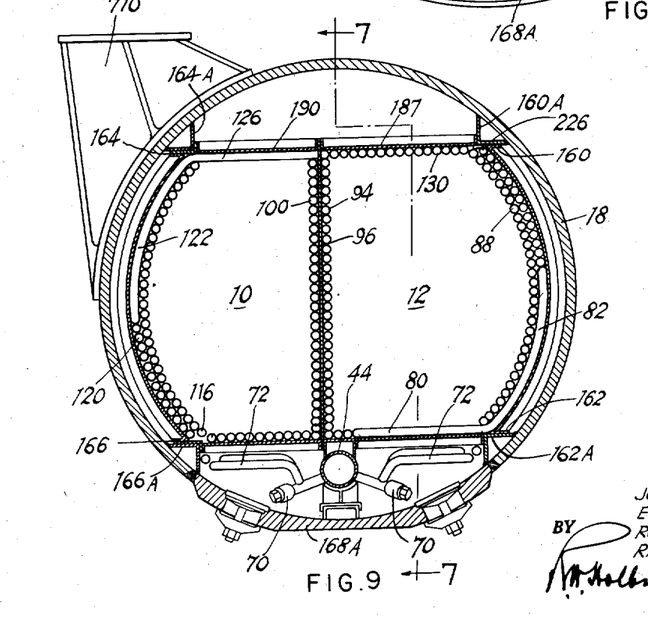
Fig. 9 is a transverse vertical section on the plane of the line 9—9 of Fig. 7, showing the relationship and structure of the walls of the combustion chambers of the saturated combustor and the superheat combustor, the saturated inlet header, and the resistors.
Figure 17:
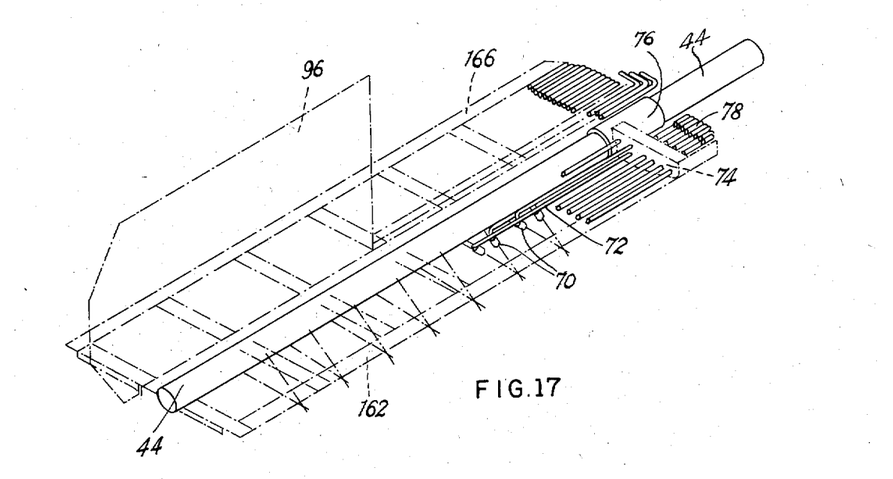
Fig. 17 is a partial cutaway isometric view of the structure at the base of the inner casing, particularly showing the water inlet header, the framework at the bottom of the inner casing, the resistor boxes, and the tubular connections between the resistor boxes and the combustor floor tubes.

The water or liquid inlet header 44, is disposed at the bottom of the inner casing 66, as indicated in Figs. 8, 9, 17 and other figures of the drawings. This header extends into the primary pressure vessel 18 toward the burners 20 and 22 and is removable from the pressure vessel with the inner casing. Distributed along the length of the liquid inlet header 44 are a number of tubular resistors 70 preferably constructed in accordance with the disclosure of the common assignee's pending patent application of the inventor Raymond F. Iager, Serial No. 51,022, filed September 24, 1948, now Patent No. 2,664,-109, and entitled Multiple Orifice Circuit Resistor for Forced Flow Boiler, and further identified by the assignee's case #2252. There is one resistor construction for each one of the tube circuits leading from the header 44, the resistors having adjustable and removable orifice elements for the purpose of equalizing the flow resistances in the tube circuits leading from the header. In the illustrative unit there are 32 of these parallel circuits forming completely fluid cooled enclosures for the combustors 10 and 12, and absorbing the major portion of the heat energy in cross-flow convection in the convection section 16.

Fig. 17 indicates the manner in which the initial parts of these circuit tubes lead from the resistors 70 at the bottom of the inner casing 66. They lead in spaced relationship through the transverse support 74 which is indicated as integral with a collar or sleeve 76 mounted on the header 44. Beyond member 74 the circuits lead through upright return bends 78 which are disposed near the gas outlet end of the primary pressure vessel 18. From the upper portions of these return bends the circuit tubes lead as floor tubes, along the floors of the combustors 10 and 12 toward the burner end of the unit. Thence the tube circuits lead laterally as indicated at 80 in Figs. 9 and 12 toward the side wall of the inner casing and then upwardly as indicated at 82 (Fig. 12) toward positions from which the tubes continue toward the burner wall. At this wall the circuit tubes form loops (i.e. 84) some of which are arranged to present openings for the burner 22. The circuit tubes continue through the inner parts 86 of these loops as side wall tubes 88 for the wall of the combustor 12. At the gas outlet end of the combustor 12 the circuit tubes are bent to form the screen loops 90 and 92 (Fig. 6). Beyond the screen formed by these loops the circuit tubes continue as combustor division wall tubes 94 along one side of the division plate 96, and then continue through the intermediate loops 98, shown in Fig. 6 as disposed between the burners 20 and 22. From these loops the circuit tubes continue as division wall tubes 100 along the opposite side of the division plate 96 and along a wall of the combustor 10.

From the gas outlet end of the combustor 10, the vapor generating tube circuits continue as gas pass wall tubes 102 along the gas pass side wall plate 104 to the gas outlet 106 of the superheater gas pass. At this position, the tubes are spaced to form the screen 108 permitting the gases to pass from the superheater gas pass to the gas pass 24.

From the screen 108, the circuit tubes continue as side wall tubes 110 along a plate disposed along the inner side of the convection vapor generating gas pass leading from the combustor 10.

From the screen 114 the circuit tubes continue through the successive loops or return bends of the vapor generating convection section 16 to a position at the rear of this section from which point the tubes continue as side wall tubes 116 along the opposite wall of the gas pass for the convection section 16.

Figure 14:
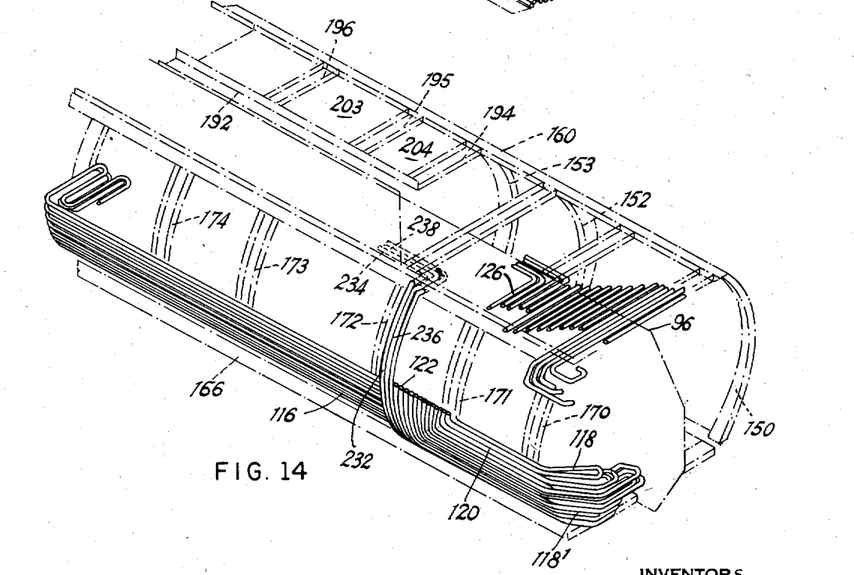
Fig. 14 is a partial cutaway isometric view showing the inner casing framework and parts of the vapor generating tubes forming the end of the common evaporator, a combustor wall, and a part of the roof of the combustors.
Figure 15:
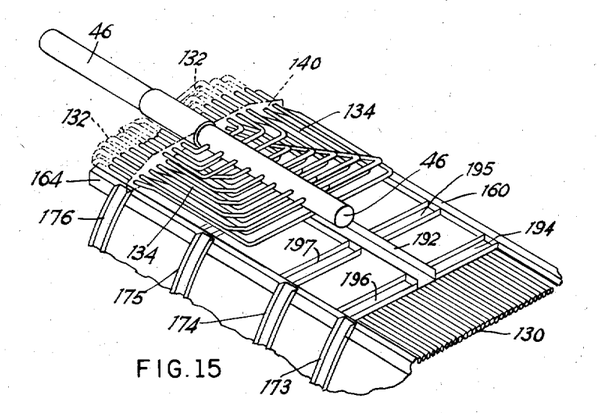
Fig. 15 is a partial isometric view showing the water and steam outlet header at the top of the inner casing and the tubular connections between this header and the vapor generating tubes at the roof of the inner casing.

The circuit tubes continue from the side wall tube sections 116 through the loops 118 which are indicated in Fig. 6 as being at one side of the burner 20. From these loops the tubes continue at positions 120 exteriorly of the side wall tube sections 116 through upright sections 122 which extend through the inner casing upper frame members 124, as indicated in Fig. 14, to roof tube sections such as 126. Along the roof, continuing parts of the circuit tubes extend laterally of the unit and then form the longitudinally extending roof tube sections 130 (Figs. 8, 9, and 15). These longitudinally extending roof tube sections continue toward the gas outlet end of the superheating and vaporizing unit, at which position there are upright return bends 132 from the upper portions of which each circuit continues through tubular connections 134 to the saturated steam and water outlet or outlet header 46. From this outlet header as above indicated, the vapor and liquid mixtures pass through the conduit 48 to the vapor and liquid separator 50.

The tubular connections 134 or end portions of the vapor generating circuit tubes connecting the roof return bends 132 to the saturated outlet header 46 are held in spaced operative positions by the arrangement indicated in Figs. 10 and 15. These tubular connections are here shown as threaded through openings in a transverse upright plate 140 forming the forward wall of a metallic housing 142 (Fig. 10) which encloses the return bends 132.

Figures 11, 12:
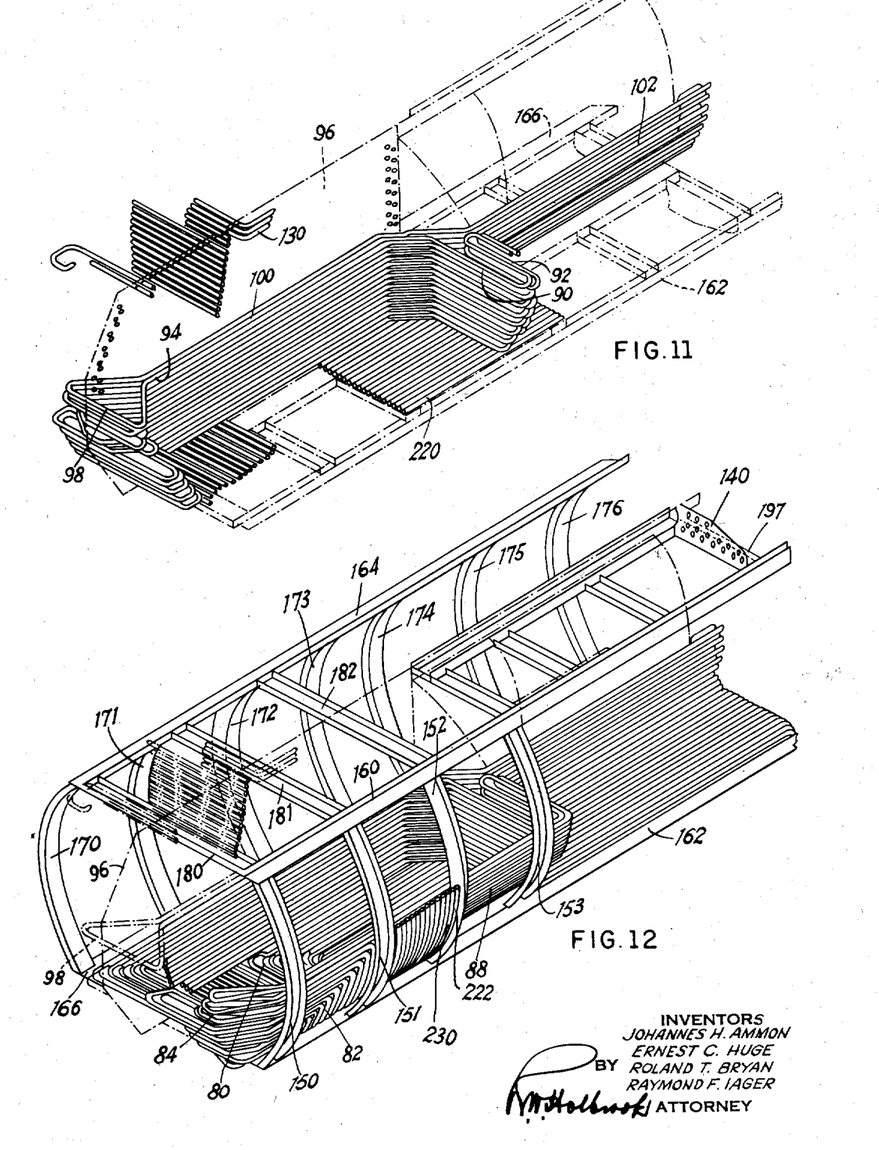
Fig. 11 is an isometric view showing the arrangement of the vapor generating tubes forming the division wall between the saturated and superheat combustors, the screen in front of the superheater coils, the gas pass wall and a section of the combustor roof.
Fig. 12 is a cutaway isometric view showing the framework of the inner casing for the primary pressure vessel and the arrangement of parts of the vapor generating tube circuits forming the superheater screen, the side wall of the superheat combustor, the floor of the superheat combustor and the arrangement of tube parts about the burner opening for the superheat combustor.
Figure 13:
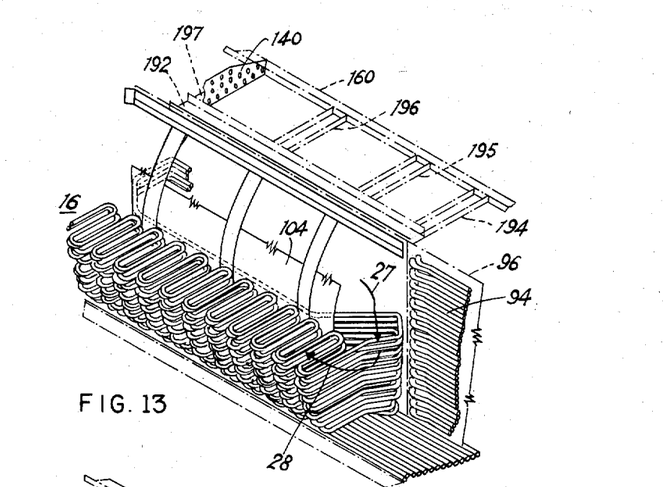
Fig. 13 is a cutaway isometric view particularly showing parts of the inner casing framework and parts of the tube circuits forming the saturated combustor wall, a gas pass wall, the convection part of the vapor generating section, and the floor of the saturated combustor.

By way of clarifying the disclosure of the different parts of the vapor generating tube circuits some of these parts will be further referred to in relation to the different components of the inner casing 66 (Fig. 10). This casing involves a metallic framework including uprights 150-156 (Figs. 10, 12 and 16) disposed along the exterior side wall of the superheater combustor 12. The upper ends of these uprights are secured, as by welding, to the upper rail 160, and their lower ends are similarly secured to the lower rail 162. At the opposite side of the inner casing 66 there are the corresponding upper and lower rails 164 and 166, respectively, and corresponding uprights 170-176 (Fig. 12). At the combustor end of the inner casing 66 the upper rails may have transverse beams secured thereto as indicated in Fig. 12 at 180-182, or the framework sides may be secured by the edge welding of the upwardly extending flanges of interposed metallic panels such as 184-190 (Fig. 10), the upwardly flanged panels such as 185 and 187 having their outside flanges welded to the rail 160 and the panels 184 and 186 having their innermost flanges welded to the upper edge portion of the division plate 96 which extends through the roof. At the opposite side of the plate 96 the innermost flanges of panels 188-190 may be welded to the division plate 96, and their outermost flanges welded to the rail 164. This type of construction is also indicated in Fig. 9. The rails 160, 162, 164 and 166 are slidable along the interfitting guide rails 160A, 162A, 164A and 166A (Figs. 8 and 9) when the inner casing is placed within or removed from the pressure vessel 18. The guide rails may be welded to the pressure vessel with the lower guide rails 162A and 166A transmitting the load of the inner casing directly to the thicker lower section 168A of the pressure vessel.

Figure 18:
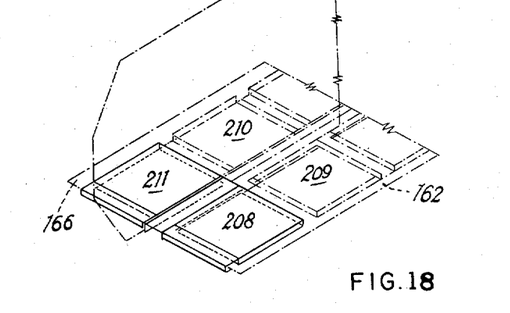
Fig. 18 is a partial isometric view showing the particular relationship of the inner casing bottom framework, the inner casing bottom plates, and the dividing wall between the combustors.

The inner casing roof, rearwardly of the combustors 10 and 12 includes a central longitudinal beam or channel 192, disposed directly beneath the liquid and vapor outlet header 46, with transverse members such as 194-197 interposed between the channel 192 and the rails 160 and 164 and welded thereto. The spaces between these transverse members, the rails, and the channel 192 are closed by the flange welding thereto of interposed panels such as 200-205. Similar constructions complete the sidewalls and the bottom of the inner casing, some of the bottom panels being shown in Fig. 18 at 208-211.

Figure 7:
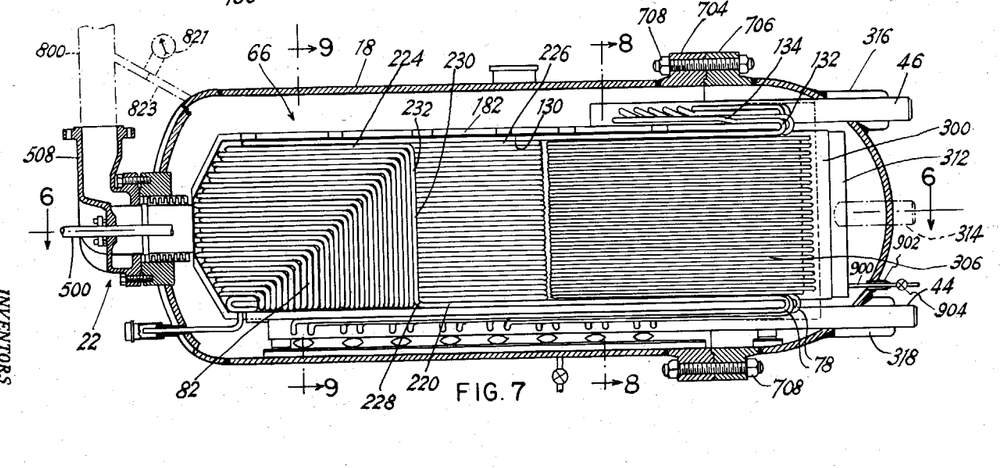
Fig. 7 is a sectional side elevation of the primary pressure vessel on the line 7—7 of Fig. 9, showing (in side elevation) the tube circuit arrangement adjacent the inlet and outlet headers of the vapor generating section, and the tube arrangement of the outside side wall of the superheat combustor.

Fig. 7 shows a floor tube section 220 continuing forwardly from a return bend 78 to a position near the vertical plane of the transverse roof member 182 where the tube is bent so as to extend upwardly as indicated at 222 to a level adjacent the roof tube 130 where the tube is then bent to extend forwardly and horizontally as at 224 to the burner wall of the casing. There it forms a loop such as the loop 86 (Fig. 6) and then continues rearwardly and horizontally as uppermost side wall tube 226 (Fig. 7) positioned similarly to the side wall tube 88, shown in Fig. 6.

Referring again to Fig. 7, the circuit tube inwardly of the unit next to the circuit having the floor tube section 220 continues forwardly to a position just beyond the bend 228 where it is bent laterally outwardly and continues upwardly as indicated at 230, all the while substantially in contact with and parallel to the adjacent or corresponding portions of the first circuit tube. In Fig. 12, between the uprights 151 and 152 there is shown a row of upright tubular sections including such sections as 222 and 230.

As may be seen in Fig. 7 when successive tubes are bent on the same radius and laid next to each other, a crescent shaped void is formed at the bends. Wherever this occurs in the combustor an alloy casting may be fitted to prevent direct heat input to the confining liner or inner casing 66. Similar radiation blocks may be placed between the side wall tubes where they open up due to equal vertical spacing matching a curved surface.

On the side of the inner casing directly opposite the tube sections 222 and 230, there is a similar but reversed arrangement of the upright tube sections 122 (Fig. 6) leading from the sections 120 to the roof. The arrangement of tube sections at this position is also indicated at the lower right hand part of Fig. 14. Here the circuit tube section from the lowermost of the loops 118 leads horizontally and longitudinally of the inner casing and externally of the side wall tube sections such as 116 (Fig. 6) to a position adjacent the framework upright 172 where it is bent to extend upwardly, as indicated at 232, to the plane of the roof tubes where this circuit tube is bent immediately rearwardly to continue as the roof tube 234 (Fig. 8). The circuit tube forming the loop 118' next to the lowermost loop likewise continues rearwardly externally of the combustor side wall tubes to a position near the upright 172 where it is bent upwardly to form the tube section 236 disposed alongside the section 232 and extending upwardly to the plane of the roof where it continues through a 90 degree bend around the similar bend in circuit tube section 232, and then continues rearwardly along the roof as the roof tube section 238 (Fig. 8).

Figure 20:
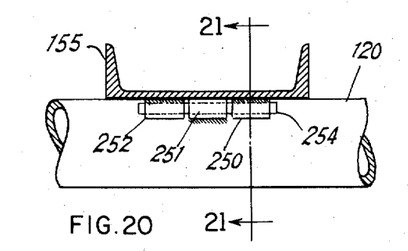
Figs. 20 and 21 are detail views of the means for holding the vapor generating tubes to their supports.
Figure 21:
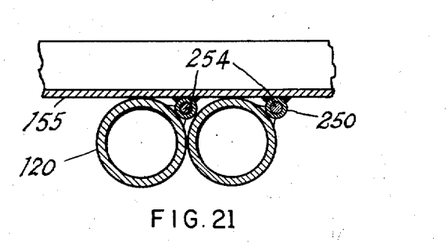

The roof tubes (130, Figs. 8 and 9) and the furnace side wall tubes such as 88 (Figs. 6 and 8) are disposed at the combustion sides of the supporting members exemplified by the inner casing uprights 150, 156 (Fig. 10) and 173–176 (Fig. 15) and the transverse roof members 194–197 (Fig. 10). The tubes are attached to such supporting members by means of hinged type joints, one of which is illustrated in Fig. 20. It consists of three aligned sleeves 250–252 with the middle sleeve 251 welded to a support (such as 155) and the remaining sleeves 250 and 252 end spaced from sleeve 251 and welded to a tube, such as 88. A pin 254 passes through all three sleeves and may have one end welded to its associated sleeve. With this construction, longitudinal expansion is permitted along the axis of the pin, but the tube is restrained from moving out of its wall or roof alignment. Thus, with the ends of the tubes fixed in headers, these joints permit thermal expansion and at the same time offer sufficient rigidity to enable the tube bundle or wall to withstand shock. At other positions the wall tubes may be held in alignment by means such as shown by the Shellenberger Patent 2,354,222, dated July 25, 1944.

Figure 16:
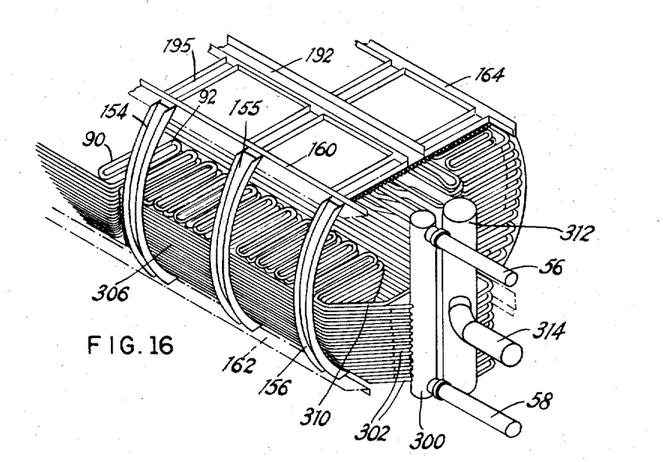
Fig. 16 is a partial cutaway isometric view showing the inlet and outlet headers for the superheater, a part of the inner casing framework, and parts of the tube circuits forming the superheater screen, the saturated steam wall tubes, and the tubular superheater convection elements.

The vapor and liquid mixtures pass from the outlet header 46 through the conduit 48 to the vapor and liquid separator 50, preferably constructed in accord with the disclosure of the copending application Serial No. 308,671, filed September 9, 1952, now Patent No. 2,739,608. Vapor or steam passes from the separator 50 through two or more conduits 54 to the inlets 56 and 58 and thence to the superheater inlet header 300. Fig. 16 shows the manner in which an upright row of superheater tube inlet sections 302 extend from the header 300. They adjoin an upright metal plate 304 at the back wall of the superheater gas pass and thus afford thermal protection for the latter. From these inlet sections 302 the superheater tubes continue as wall tube sections 306 (Figs. 6 and 16) contiguous to the upright side wall of the inner casing to which they may be secured in the manner shown in Fig. 20.

These wall tube sections of the superheater tubes terminate just rearwardly of the screen loops 90 and 92 of the vapor generating tubes (Fig. 6) at which position the superheater tubes are bent to form the rearwardly successive loops or return bends 308, each tube forming a plurality of these loops within the same horizontal zone. Collectively, for each tube, the loops and their associated parts form a horizontal superheater platen. Each platen may rest on the subjacent platen.

Figure 3:
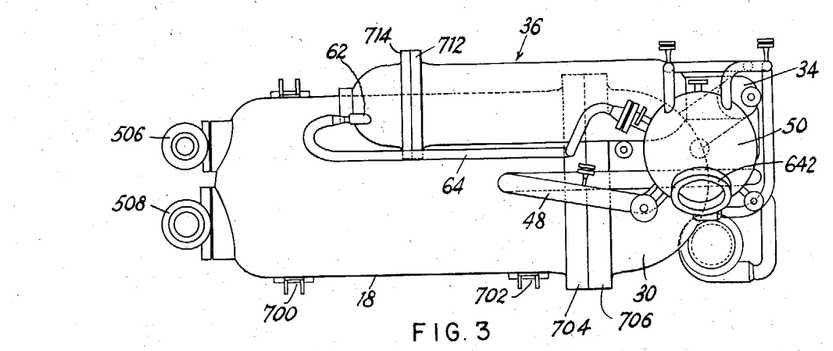
Fig. 3 is a plan of the unit shown in Figs. 1 and 2.

Each superheater platen has an outlet section 310 disposed in parallelism with one of the inlet sections 302 (Fig. 6) and connected to the upright superheater outlet header 312 from which a tubular outlet connection 314 leads through the wall of the detachable end or dome 30 of the primary pressure vessel 18. At this position, the connection 314 is joined with the pressure vessel metal by a thermal sleeve structure 315 such as shown by the patent to Rowand 2,331,932, October 19, 1943 (Fig. 3). Similar thermal sleeve structures are involved at 316 (Fig. 7) around the saturated outlet header 46, at 318, around the inlet header 68, and for other tubular connections through the pertinent pressure vessels for the separator and the economizer, as well as for the vapor generator, and superheater. The superheater may have a suitable small diameter tubular drain connection leading to atmosphere from the lower end of header 312. Such a connection is illustrated at 900 in Fig. 7, leading from the lower end of the superheater outlet header through a thermal sleeve 902 and a valve 904.

From the superheater outlet connection 314, the superheated vapor or steam passes at high pressure (of the order of 500–2000 p.s.i.a.) and high temperatures (as high as 1100 F.) to a point of use.

The furnace gases, after heating the coils, or loops of the superheater proceed through the gas pass 24 (Fig. 6), and then across the convection section formed by the coils 16 of the vapor generating circuit tubes. Thence, the gases pass from the primary pressure vessel through the outlet 32, and then through the conduit 34 (Fig. 4) to the economizer 36. Within the pressure vessel of this component the gases contact the spaced coils or return bends 38 of a multiplicity of parallel circuit economizer tubes leading from the inlet header 400 through the heat exchange spaces of the economizer, and, thence, to the economizer outlet header 402. From this header, the liquid or vapor and liquid mixtures pass through the outlet connection 62 to the conduit 64, leading to a position below the normal liquid level of the separator 50.

The fluid heated by the economizer travels through the economizer tube circuits in counter-flow until the gas inlet is reached. From that position the economizer tubes form a return wall in parallel flow to the outlet header 402.

When the illustrative unit is fired with oxygen as a combustion supporting medium, the moisture content of the gases entering the economizer is of the order of 26–30%, as compared to a normal moisture percentage of 6–8% when air is the combustion supporting medium. The moisture is substantially all condensed in the economizer and collects in a pocket near the gas outlet end of the economizer and is discharged therefrom through the overboard discharge line 815 (Fig. 1) for both gas and condensed vapor when operating submerged and at high pressure combustion. This condensation reduces the discharge temperature and increases the economizer heat absorption.

The economizer inlet header 400 has an inlet connection 404, leading through the detachable dome or end structure 406 of the economizer with a thermal sleeve connection therewith. The connection 404 receives liquid at high pressure from a suitable pump.

The economizer may be generally characterized as operating on the counter-flow principle. It is a bare tube and cross-flow economizer. It is compact and its headroom requirements are low. Its operation is characterized by almost complete condensation of flue gas water vapor.

Figure 23:
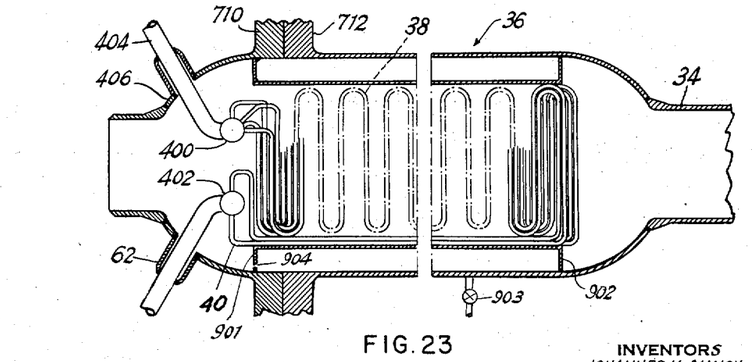
Fig. 23 is a plan section of the economizer.

The economizer has a separate shell drain 903 for any moisture collecting between the gas inlet and gas outlet blanking flanges 901 and 902 (Fig. 23). Flange 901 also has a pressure equalizing hole 904 drilled in it at the bottom of the economizer.

For providing the high temperature and high pressure heating gases for heating the vapor generating tubes, the superheater tubes and the economizer tubes, the burners 20 and 22, for the saturated combustor 10 and the superheat combustor 12, respectively, are supplied with fluid fuel, and combustion supporting gas under high pressure. The fuel, i.e. Diesel oil, is supplied to the burners through the tubes 500 and 502, centered with respect to the compressed gas inlets 504 and 506 and the gas (or windbox) connections 508 and 510. Air may be supplied as the combustion supporting medium under some conditions, and oxygen under other conditions.

Referring in more detail to the vapor and liquid separator 50, the vapor and liquid mixtures from the conduit 48 enter an annular chamber 600 formed between the pressure vessel wall and the annular ring 602. This ring has upper and lower flanges 604 and 606 contacting the pressure vessel wall, and the ring is formed with a plurality of circumferentially distributed outlets such as 610–612 directing vapor and liquid mixtures downwardly and somewhat tangentially into the whirl chamber 616. The whirling action throws the liquid to an outer position where it passes through the annular whirl chamber outlet 618 to the liquid space beneath the normal liquid level 620. The whirling motion of the separated liquid is decreased by the effect of the radial plates 622–625 which support the conical plate 628 forming the bottom of the whirl chamber. The separated liquid continues downwardly through the vortex inhibitor 630 and then through the downcomer outlet connection 632 to the downcomer 60. The separated vapor passes upwardly through the center of the whirl chamber to and through a multiple plate scrubber 634 which consists of spaced corrugated plates providing a multiplicity of upward passages for the upward flow of vapor and the separation of any remaining liquid. The separated vapor then passes into the space within the dome 636. From this space the vapor passes through the vapor outlets 638 and 640 to the superheater inlet conduits 52 and 54.

Fluid heated by the economizer 36 flows through the conduit 64 and thence through the feed inlet pipe 646 extending transversely of the separated liquid space of the separator 50 where the temperature of economizer efflux is increased toward saturated temperature.

Figs. 1, 2, 4, 5, 6, and 7 indicate the construction, support and arrangement of the pressure vessels for the combustors, the economizer, and the superheater. The pressure vessel for the combustors is operatively positioned on the saddles or supports 700 and 702 and its two component parts are formed with the heavy circular flanges 704 and 706 normally detachably secured together by a multiplicity of bolts 708.

The economizer is mainly supported upon the combustor pressure vessel by a bracket 710, the remainder of its support being provided by the welded conduit 34 leading from the gas outlet of the combustors to the gas inlet of the economizer. Like the primary pressure vessel for the combustors, the economizer pressure vessel has two main parts detachably secured together in pressure tight relationship. They are provided with the heavy matching flanges 712 and 714 for this purpose.

One reason for having the economizer constructed as a separate pressure vessel is the corrosion problem which is inherent in the use of sulphur bearing fuels when there is partial or total moisture condensation. Such corrosion problem, involving the problematical transition of $SO_2$ to $SO_3$, is not complicated by the design and replacement requirements of other main system components when the economizer involves a separate pressure vessel.

Figure 22:
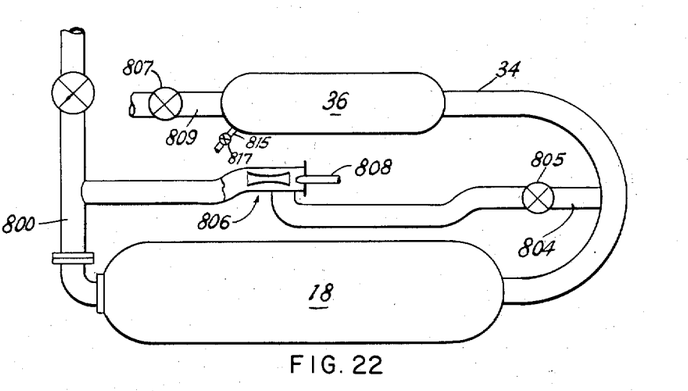
Fig. 22 is a diagrammatic view showing the manner in which a recirculated gas system is incorporated in the illustrative unit.

When oxygen is used as the gaseous combustion supporting medium and a gas recirculation system such as that indicated diagrammatically in Fig. 22 is employed, this system includes a recirculated gas duct 804 which may be considered as in communication with the recirculated gas connection 34 of Fig. 1. This conduit 804 (valved at 805) conduits recirculated gas to a jet recirculator 806 in which an oxygen receiving nozzle 808 is so disposed that the entering oxygen may induce a flow of recirculated gas through the conduit 802 to the gas or air conduit 800 leading to a burner. Both of the burners may be similarly connected. When pure oxygen is used as the combustion supporting medium under a combustion chamber pressure of the order of 600 p.s.i.a., the flame temperature resulting from the burning of the diesel fuel in an atmosphere of pure oxygen would be greater than 500 F. The recirculated gas is used to bring this temperature in line with the combustion temperature when using air as a combustion supporting medium.

When oxygen is used under submerged submarine operation, the valve 807 in the economizer exhaust line 809 is closed and the valve 817 in the smaller diameter exhaust line 815 is open for underwater overboard discharge of the high pressure combustion gases. The positions of the valves 807 and 817 are reversed for surface operation when air is used as the combustion supporting medium.

The overboard discharge valve 811 controls the gas pressure when the unit is operated under oxygen firing submerged condition. The gas expander and boiler gas pressure drop determine the combustor pressure during surface operation.

In the illustrative unit, the oil flow to the burner of the superheat combustor is greater than the oil flow to the burner of the saturated combustor and under certain low loads the saturated burner is not required and the superheated vapor temperature will come what it will. Because of this cutting off of the saturated burner, the superheater burner may be controlled only in response to steam pressure. Then, when the saturated burner is in use, its firing rate may be controlled in response to steam temperature. In this manner, the saturated burner or combustor, in changing the steam generation rate, acts as a desuperheater controlled by change in steam load.

Referring again to the structure and arrangement of the convection superheating section 14 and the convection vapor generating section 16, as indicated in Fig. 8, it is to be particularly noted that it is of paramount importance for the illustrative unit to include vapor generating circuits of substantially equal heat absorption, and this desideratum is promoted by having the tubular convection coils in section 16 of uniform total length and of uniform coil width. They are single plane coils and are stacked flatwise one upon the other, permitting the stack of coils to have a vertical curvature corresponding generally to the curvature of the left hand wall of the inner casing as it is shown in Fig. 8. The coils may be referred to as progressively horizontally offset in successive zones. This arrangement provides for the outwardly bowed wall 112 of the oval gas pass 24, the opposite wall 104 of the gas pass being similarly outwardly bowed to follow the upright contour of the stack of uniform superheater coils in the superheating convection section 14.

The above described structure arrangement of the heat exchange elements in the convection sections 14 and 16, with the interposed gas pass 24 of oval cross section, promotes effective utilization of all of the space within the inner casing, and provides the necessary gas pass from one combustor to the other, without necessitating an increase in the diameter of the inner casing or the pressure shell.

In the operation of the illustrative system, the firing rate is preferably controlled in accord with steam (or vapor) demand, and the proportion of fuel to oxidant is varied in accord with the change of oxidant. Feed water supply is also controlled in accord with steam demand.

The firing rate of the superheater furnace is controlled from steam pressure while the firing rate of the saturated furnace is controlled primarily from steam temperature. This manner of control is required in order to maintain steam pressure control at low loads when the superheater furnace only is fired.

Oxygen flow when submerged and air flow when surfaced, to the superheater furnace is controlled from steam pressure and to the saturated furnace is controlled from final steam temperature. In order to facilitate changing from one oxidant to the other, the controls are so set as to convert air flow measurements to equivalent amounts of oxygen. Fuel flow to the superheater combustor is controlled from final steam pressures as modified by oxygen flow. Fuel flow to the saturated combustor is controlled from final steam temperature and oxygen flow.

Recirculated gas flow to both the saturated combustor and the superheater combustor is controlled from oxygen flow to those combustors, respectively.

Combustor gaseous pressures are maintained at desired values by suitable pumps, compressors or other pressure source, regulated by suitable control system components.

While we are not claiming any specific control system for the illustrative unit, such a system is shown and claimed in the co-pending application of Barnard et al., S.N. 265,898, filed on January 10, 1952, now Patent No. 2,876,727.

The illustrative vapor generating and superheating unit maintains a predetermined vapor temperature over a wide load range; its fluid heating components are vented, and are drainable; its different vapor generating circuits have uniform heat absorption characteristics; and it may be quickly started with a dry superheater because of the disposition of the superheater surface and because of the complete envelopment of both parallel combustion chambers by the same group of vapor generating tubes.

While in accordance with the provisions of the statutes we have illustrated and described herein the best forms of the invention now known to us, those skilled in the art will understand that changes may be made in the method and apparatus disclosed without departing from the spirit of the invention covered by our claims, and that certain features of our invention may sometimes be used to advantage without a corresponding use of other features.

What is claimed is:

1. In a vapor generating and superheating unit, a vapor generating combustor, a vapor superheating combustor, vapor generating tubes defining the boundaries of each combustor, a first gas pass leading from the vapor generating combustor, parts of said tubes forming a bank of spaced tubes constituting a convection vapor generating section in said gas pass, a second gas pass leading from the superheater combustor, a bank of spaced tubes constituting a convection vapor superheater in the second gas pass, and means for separately and independently firing the combustors, the second gas pass leading into the first gas pass at a position ahead of the convection vapor generating section, the firing means of the vapor generating combustor being regulable to control vapor temperature.

2. In a vapor generating and superheating unit, a vapor generating combustor, a vapor superheating combustor, means including parts of forced flow vapor generating tubes parts of which are contiguously arranged so as to define boundaries of the combustors, means for independently firing the combustors at high furnace temperatures and pressures, a first gas pass leading from the vapor generating combustor, a convection vapor generating section including parts of some of said tubes in said gas pass, the convection vapor generating section including a bank of spaced apart tubular sections of said forced flow tubes, a second gas pass leading from the superheater combustor, a convection vapor superheater in the second gas pass subject only to the gas flow from the superheating combustor, and means for separately and independently firing the combustors for controlling vapor superheat temperature.

3. In a vapor generating and superheating unit, a vapor generating combustor, a vapor superheating combustor, the same forced flow vapor generating tubes defining boundaries of both combustors, said tubes having substantially uniform heat absorption characteristics, a first gas pass leading from the vapor generating combustor, a convection vapor generating section in said gas pass, a second gas pass leading from the superheater combustor, a convection vapor superheater in the second gas pass, and means for separately and independently firing the combustors, the second gas pass leading into the first gas pass at a position between the convection vapor generating section and the vapor generating combustor, the firing means of the vapor generating combustor being operable to control vapor temperature.

4. In a vapor generating and superheating unit, a vapor generating combustor including a combustion chamber, a vapor superheating combustor, means firing the combustors, the same forced flow vapor generating tubes defining the boundary surfaces of both combustors, a first gas pass leading from the vapor generating combustor, a convection vapor generating section in said gas pass, a second gas pass leading from the superheater combustor, a convection vapor superheater in the second gas pass, and means for separately and independently firing the combustors, the second gas pass leading into the first gas pass at a position ahead of the convection vapor generating section, firing means of the vapor generating combustor being operable to control vapor temperature.

5. In a vapor generating and superheating unit, a vapor superheating combustor and vapor generating combustor each having walls defined by vapor generating tubes, means independently firing said combustors at gas pressures in excess of 500 p.s.i.a. with one of the firing means controlled from vapor temperature, a metallic inner casing enclosing the combustors, a pressure vessel capable of withstanding the gas pressure and removably housing the inner casing with an annular space between the casing and the pressure vessel wall, means supplying said annular space with gas under a pressure higher than the gas pressure within either combustor, a common gas flue or uptake from which the gaseous combustion products from each combustor pass, and a gas recirculation system receiving partially cooled gases from said flue and conducting those gases to the firing zone.

6. In a forced flow vapor generating and superheating unit, a pressure vessel of cylindrical cross-section, forced flow vapor generating tubes constituting vapor generating circuits disposed within the pressure vessel and arranged along the boundaries of two furnaces disposed within the pressure vessel, parts of said circuits arranged along walls of a convection vapor generating gas pass leading from one of the furnaces and along the walls of an intermediate gas pass of oval cross-section conducting the gases from the other of said furnaces to the first furnace at a position in front of the convection vapor generating gas pass, other parts of said circuits forming return bend coils of uniform width constituting a bank of vapor generating tubes within said vapor generating gas pass, and return bend coils of vapor superheating tubes with their successive tubular sections disposed transversely of gas flow between the other wall of said oval-shaped gas pass and the opposite side of the pressure vessel and in the path of the gases flowing from the other furnace to the inlet of said first mentioned gas pass.

7. In high pressure fluid heat exchange apparatus, wall means forming the confines of a high temperature gas space or chamber, means normally providing said chamber with high temperature furnace gases, said wall means including contiguously arranged liquid vaporizing tubes and space closing means associated with the tubes; means maintaining such a flow of vaporizable liquid to the tubes that the wall means is maintained at a temperature of the order of the saturation temperature; means forming an outer casing spaced outwardly of said wall to provide therebetween an enclosing gas space, means maintaining a gas pressure in said enclosing gas space higher than the gas pressure in said chamber, said last named means including a tube conducting gas toward said enclosing space, and means indicating gas flow through said tube to thereby constitute a gas leak detector with respect to said wall means.

8. In a high temperature gas heated forced flow vapor generating and superheating unit, a pressure vessel of circular cross section, a metallic inner casing arranged as walls spaced fom the pressure vessel walls to concurrently form an internal gas-tight enclosure and a separate non-communicating annular volume within said vessel, a plurality of contiguous vaporizable fluid cooled tubes arranged along and supported by the inner walls of said casing enclosure to form a completely fluid cooled high temperature gas enclosure, a supply of high pressure oxidizing gas at a pressure greater than any pressure within said high temperature enclosure, means supplying said oxidizing gas to said high temperature enclosure, means communicating said supply of high pressure oxidizing gas with said annular volume to create a normally quiescent gas volume at a pressure greater than the pressure within said high temperature enclosure, and a fluid flow indicator associated with said communicating means to indicate flow of a pressure oxidizing gas to said chamber when a leak in said inner casing develops.

9. In a vapor generating and superheating unit, a vapor generating system including forced flow vapor generating tubes some of which define a combustion chamber, means firing the combustion chamber at high gas pressures, a superheater heated by the combustion products, an inner casting enclosing and supporting said system as well as the superheater and the combustion chamber, a pressure vessel enclosing the inner casing, the inner casing with all its pressure parts being removable as a unit from the pressure vessel, said vapor generating tubes being arranged as forced flow tubes leading in parallel from a common inlet at the bottom of the unit to a common outlet at the top of the unit, said tubes being drainable at their lower ends and ventable at their upper parts, a second combustion chamber defined by other parts of the vapor generating tubes, a gas pass leading from the second combustion chamber to a gas outlet through the wall of the pressure vessel, further parts of the vapor generating tubes constituting a convection section in said gas pass, means firing the second combustion chamber independently of the first combustion chamber, another gas pass conducting the outlet gases from the first combustion chamber to a position of juncture with the combustion products from the second combustion chamber.

10. In a vapor generating and superheating unit, a vapor generating system including forced flow vapor generating tubes some of which define a combustion chamber, means firing the combustion chamber at high gas pressures, a superheater heated by the combustion products, an inner casing enclosing and supporting said system as well as the superheater and the combustion chamber, a pressure vessel enclosing the inner casing, the inner casing with all its pressure parts being removable as a unit from the pressure vessel, a convection superheater heated by the combustion chamber gases and constituting the superheating section, a second combustion chamber defined by other parts of the vapor generating tubes, means independently firing the second combustion chamber at a high gaseous pressure, a gas pass leading from the second combustion chamber to a position exteriorly of the pressure vessel, a convection vapor generating section disposed in said gas pass and formed by the outlet portions of the vapor generating tubes, another gas pass leading from the gas outlet of the first mentioned combustion chamber to a position of juncture with the gases from the second combustion chamber for mixture with the latter gases and flow therewith over the convection vapor generating section, and means conducting generated vapor from the first mentioned tubes to the superheater.

11. In a vapor generating and superheating unit, a vapor generating system including forced flow vapor generating tubes some of which define a combustion chamber, means firing the combustion chamber at high gas pressures, a superheater heated by the combustion products, an inner casing enclosing and supporting said system as well as the superheater and the combustion chamber, a pressure vessel enclosing the inner casing, the inner casing with all its pressure parts being removable as a unit from the pressure vessel, convection vapor generating and superheater sections each having vertically stacked generally horizontal flat tubular coils progressively offset in successive horizontal zones to substantially utilize all the space within and adjacent the pressure vessel shell by forming a curved shape, the superheater section including a superheater combustor fired separately from the first mentioned combustion chamber which constitutes a saturated combustor, the successive vapor generating coils being the same length and the successive superheater coils being of the same length and forming an oval shaped opening for the passage of the gases from the superheater combustor and heating surface combination to the gas exit of the saturated combustor.

12. In a high temperature gas heated forced flow vapor generating and superheating unit, a pressure vessel of circular cross section, a plurality of contiguous vaporizable fluid cooled tubes arranged within said vessel to define fluid cooled boundaries of an inner high temperature gas volume, a metallic casing contacting the outer sides of said tubes and forming a gas-tight fluid cooled enclosure to contain said high temperature gas volume, said casing being spaced from the walls of said vessel to form a separate annular gas volume about said casing and within said pressure vessel, a supply of high pressure oxidizing gas means supplying said oxidizing gas to the high gas temperature interior of said enclosure, means directly communicating said supply of oxidizing gas with said separate annular gas volume to pressurize said volume with a normally quiescent gas at a pressure greater than the gas pressure within said fluid cooled enclosure, a second pressure vessel superjacently supported by and receiving high pressure heating gases directly from said first named pressure vessel, and a convection heated economizer in said second vessel arranged to condense some of the condensible vapors from the heating gases passing therethrough.

References Cited in the file of this patent

UNITED STATES PATENTS

| | | |
|---|---|---|
| 1,948,538 | Noack | Feb. 27, 1934 |
| 2,006,403 | Mayr | July 2, 1935 |
| 2,086,812 | Luty | July 13, 1937 |
| 2,183,893 | Price | Dec. 19, 1939 |
| 2,184,845 | Noack | Dec. 26, 1939 |
| 2,346,179 | Meyer et al. | Apr. 11, 1944 |
| 2,443,841 | Sweeney et al. | June 22, 1948 |
| 2,547,135 | Mercier | Apr. 3, 1951 |
| 2,568,024 | Pfenninger | Sept. 18, 1951 |
| 2,641,233 | Hemenway et al. | June 9, 1953 |

FOREIGN PATENTS

| | | |
|---|---|---|
| 638,552 | Great Britain | June 14, 1950 |